(12) United States Patent
Bose et al.

(10) Patent No.: US 7,412,551 B2
(45) Date of Patent: Aug. 12, 2008

(54) METHODS AND APPARATUS FOR SUPPORTING PROGRAMMABLE BURST MANAGEMENT SCHEMES ON PIPELINED BUSES

(75) Inventors: Bijoy Bose, San Jose, CA (US); Irwin Vaz, San Jose, CA (US); Sridhar Lakshmanamurthy, Sunnyvale, CA (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 10/882,375

(22) Filed: Jun. 30, 2004

(65) Prior Publication Data

US 2006/0002412 A1 Jan. 5, 2006

(51) Int. Cl.
*G06F 13/36* (2006.01)

(52) U.S. Cl. ........................ 710/120; 710/243; 710/317; 370/362; 370/412

(58) Field of Classification Search ................. 710/107, 710/112, 113, 120, 243, 317; 370/356, 359, 370/362–365, 412
See application file for complete search history.

(56) References Cited

U.S. PATENT DOCUMENTS 6,701,407 B1 * 3/2004 Honjo et al. ................. 710/317
7,200,699 B2 * 4/2007 Bose et al. ................... 710/120
2003/0035375 A1 * 2/2003 Freeman ...................... 370/238
2004/0059862 A1 * 3/2004 Chan .......................... 710/316
2006/0031625 A1 * 2/2006 Chan .......................... 710/316

* cited by examiner

*Primary Examiner*—Glenn A Auve
(74) *Attorney, Agent, or Firm*—Blakely, Sokoloff, Taylor & Zafman LLP

(57) ABSTRACT

Methods and apparatus for supporting programmable burst management schemes on pipelined buses. The apparatus includes a plurality of bus masters (masters), configured in a plurality of clusters, and a plurality of target sub-groups. Each target sub-group includes one or more shared resource targets. A scalable chassis infrastructure is used to interconnect the targets with the clusters using a crossbar interconnect configuration including pipelined command, and data buses. The interconnect includes sub-group multiplexers for each sub-group and sub-group selection multiplexers coupled to each cluster. A two-stage arbiter, operatively coupled to the targets, sub-group multiplexers, and sub-group selection multiplexers, is employed to arbitrate transaction requests issued from the masters to the targets and manage transactions. The two-stage arbiter includes a provision for supporting programmable burst management, wherein selected sub-groups can be tuned for handling short or long burst traffic.

26 Claims, 11 Drawing Sheets

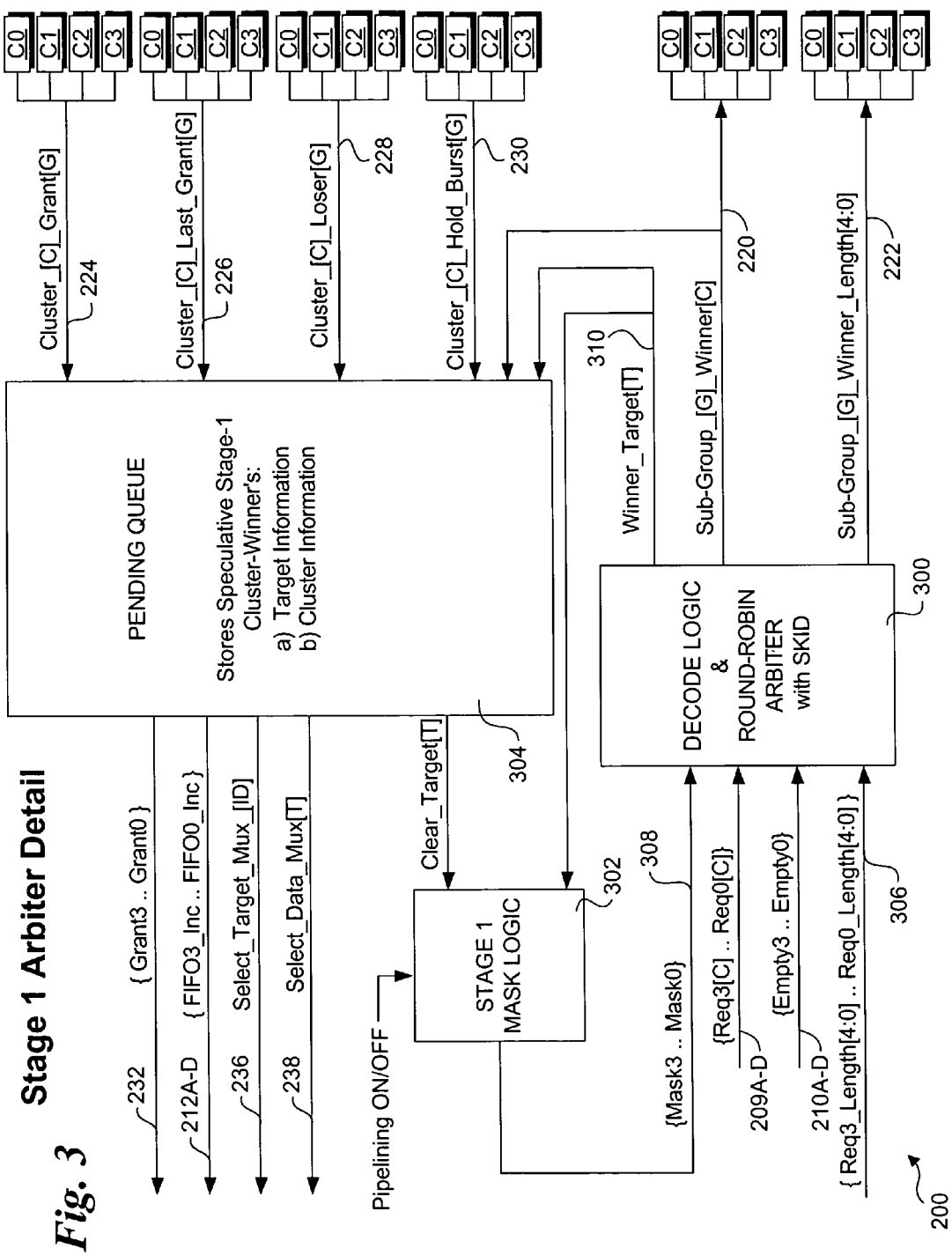
Fig. 3 Stage 1 Arbiter Detail

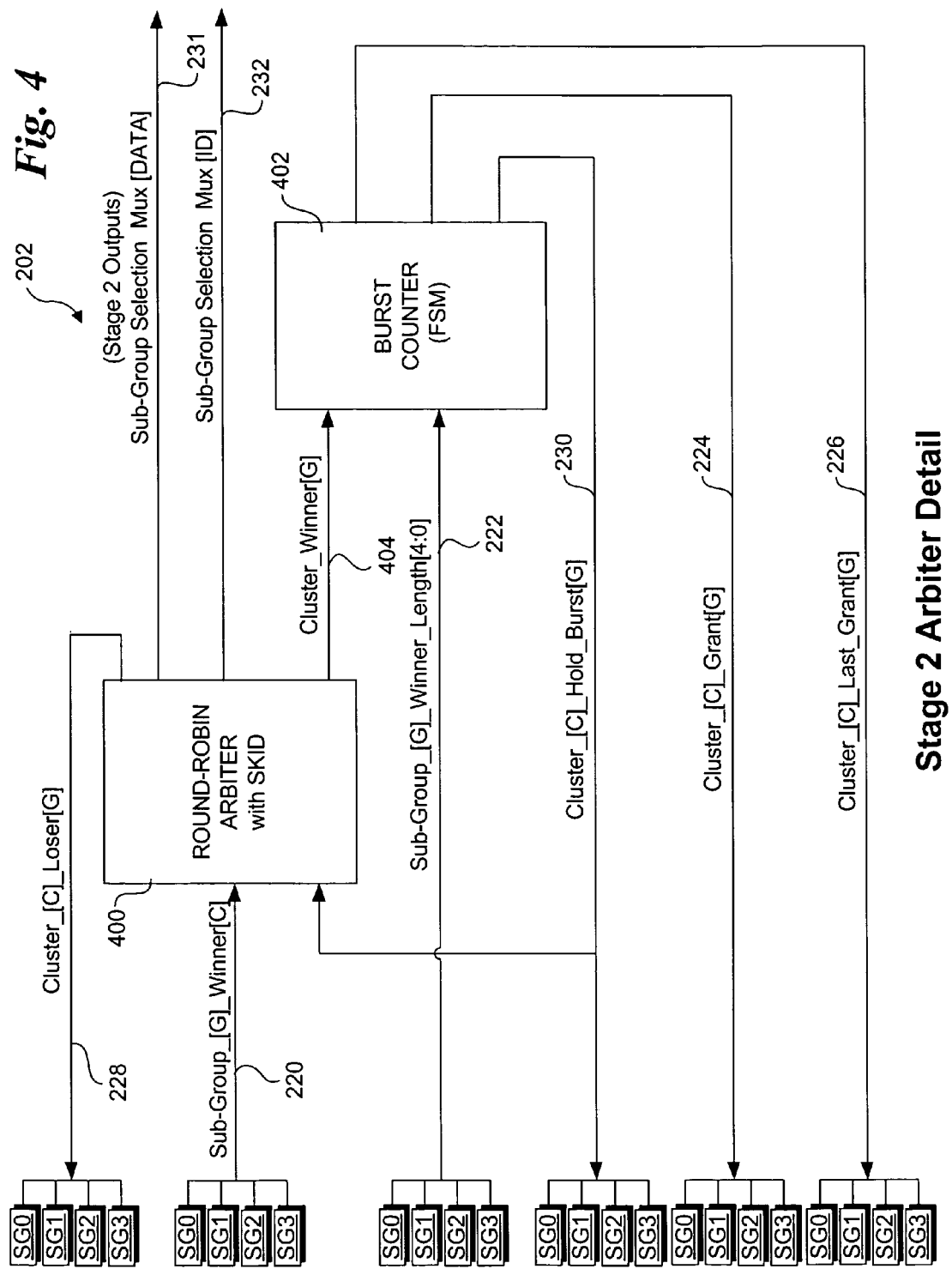

METHODS AND APPARATUS FOR SUPPORTING PROGRAMMABLE BURST MANAGEMENT SCHEMES ON PIPELINED BUSES

FIELD OF THE INVENTION

The field of invention relates generally to network equipment and, more specifically but not exclusively relates to techniques for supporting programmable burst management on a pipelined data bus.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select and appropriate network port via which to forward the packet, etc. These operations are collectively referred to as "packet processing."

Modern network processors perform packet processing using multiple multi-threaded processing elements (referred to as microengines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

Each of the shared resources is connected to the network processor by some type of bus or buses. In general, conventional buses includes address lines, data lines, and command lines. In some cases, a particular type of resource may employ a dedicated bus. In other cases, multiple shared resources may be tied to the same bus.

In order to support concurrent access to shared resources, the network processor employs a bus management scheme. There are several types of arbitration situations. Under one situation, one or more data transaction requesters (e.g., microengine threads) may request access to a particular resource via a dedicated bus. Under another situation, multiple requesters request access to different shared resources coupled to a common bus. This later situation may prove particularly difficult to perform bus management in an efficient manner.

Ideally, all data requests would be similar in size, and all data transaction cycles would consume similar latencies. This would support a higher degree of pipeline synchronization, enabling the resource access latencies to be more easily hidden. Unfortunately, the sizes of data requests may vary significantly. Depending on the particular resource and application, data transactions may comprise short burst, long bursts, or a mixture thereof. Thus, shared resources sometimes need to support data transactions having variable lengths. This is particularly true when considering a network device as a whole, wherein some of the shared resources typically see short burst transactions, while other shared resources see longer burst transactions. In contrast, a single fixed pipeline architecture will not handle both short and long burst transactions in an efficient manner at the same time; pipeline architectures designed for short burst transactions are inefficient for handling long burst transactions, while pipeline architectures designed for long burst transactions are inefficient for handling short burst transactions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a functional block schematic diagram illustrating details of one embodiment of the sub-group arbiter of FIGS. 2a and 2b;

FIG. 4 is a functional block schematic diagram illustrating details of one embodiment of the cluster arbiter of FIGS. 2a and 2b;

DETAILED DESCRIPTION

Figure 1A:
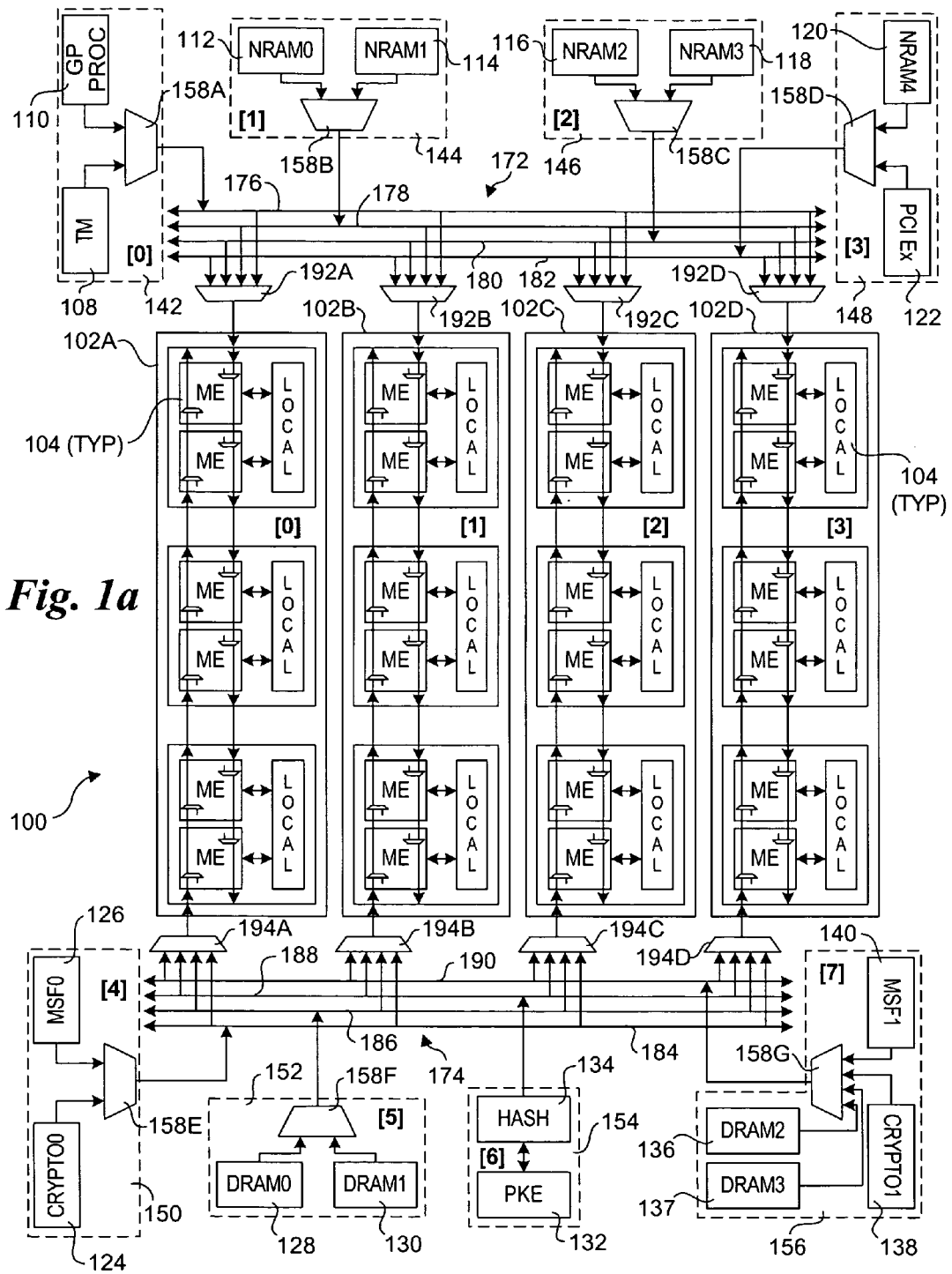
FIG. 1a is a schematic diagram of a network processor architecture in which multiple bus masters are connected to multiple sub-groups of shared target resources (targets) via a chassis interconnect having a crossbar configuration, according to one embodiment of the invention.

Embodiments of methods and apparatus for supporting programmable burst management schemes on pipelined buses are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In general, the various packet-processing elements (e.g., microengines) of a network processor, as well as other optional processing elements, such as general-purpose processors, will share access to various system resources. Such shared resources typically include memory stores (e.g., SRAM, DRAM), hash units, cryptography units, etc. The shared resource targets and their consumers are interconnected via sets of buses known as the "chassis." The chassis is a high-performance interconnect on the network processor chip that provides the on-chip data transport infrastructure between numerous processing elements on the chip and the numerous shared resources. The shared resources may be on-chip or accessible via appropriate built-in chip interfaces.

Under typical network processor configurations, various bus schemes are employed to enable shared access to the shared resources. Since only a single set of signals can be present on a given bus at any point in time, buses require multiplexing and the like to allow multiple resource consumers to access multiple resource targets coupled to the bus. One technique for relieving access contention is to provide separate buses for data reads and data writes. As used herein, these buses are known as push buses (for reads), and pull buses (for writes). (It is noted that terms push and pull are from the perspective of the shared resource.) However, implementing separate buses for reads and writes increases the bus count, and thus adds to the already crowded signal routing requirements for the network processor chip. Consider, under a conventional approach, sharing access to 16 shared resources comprises 16 independent sets of buses, with each set of buses including a read bus, a write bus, and a command bus for a total of 48 buses. To support routing for such a large number of buses, dies sizes must be increased; this directly conflicts with the goal of reducing dies sizes and processor costs.

According to one aspect of the embodiments described herein, a scalable chassis infrastructure based on principles of a crossbar architecture is implemented to enable access to a large number of shared resources without requiring individual bus sets for each shared resource. The chassis supports transactions between two types of agents: masters and targets. In one embodiment, the masters are organized into groups ("clusters") that share common bus infrastructure. The chassis also comprises a set of high performance buses, including command buses that move commands from masters to targets, and respective sets of push and pull data buses and their associated request identifier (ID) buses.

A key challenge in such a high performance interconnect scheme is to achieve high utilization and bounded average latency on the buses such that the delivered bandwidth on the interconnect tracks very closely to the peak bandwidth provisioned for the interconnect. As discussed above, due to die-size limitations, the number of targets typically exceeds the number of available intra-chip data routing buses. According to one embodiment, this issue is addressed by grouping multiple targets into sub-groups that share a common databus track.

FIG. 1 shows a network processor architecture 100 that includes a scalable chassis infrastructure supports data transactions between various masters and grouped targets, according to one embodiment. At the heart of the architecture are four processing element clusters 102A, 102B, 102C, and 102D. In the illustrated embodiment, each of processing element clusters 102A-D includes six packet-processing microengines (MEs) 104. In other embodiments, each processing element cluster may include a different number of microengines, such as, but not limited to, four or eight microengines.

In the illustrated embodiment, microengines 104 are grouped into sets of two microengines that share a common set of local resources 106. Local resources may typically include resources that are specific to a microengine (or pair of microengines in this case), such as a local memory, instruction cache, registers, etc. In other embodiments, microengines may be configured to share local resources in groups having more than two members, or they may be configured to have the own set of local resources on an individual basis.

The embodiment of FIG. 1 shows various exemplary shared resource targets that are generally located around the periphery of network processor architecture 100. In turn, the grouped shared resources are grouped at a second larger level to bus sets located toward the top and bottom of FIG. 1. The targets shown toward the top of FIG. 1 include a traffic manager (TM) 108, a general-purpose processor (GP-Proc) 110, narrow random access memory (NRAM) control channels 112, 114, 116, 118, and 120, and a PCI (Peripheral Component Interconnect) Express (Ex) interface 122. In general, an NRAM control channel is illustrative of a control channel that provides access control to various types of memory stores comprising narrow RAM devices, such as, but not limited to SRAM, Rambus DRAM (RDRAM), Quad Data-Rate (QDR) RAM, etc. The targets shown toward the bottom of FIG. 1 include a first cryptographic (CRYPTO0) unit 124, a first media switch fabric (MSF0) interface 126, DRAM control channels 128 and 130, a public key encryption (PKE) unit 132, a hash unit 134, DRAM control channels 136 and 137, a second cryptographic (CRYPTO1) unit 138, and a second media switch fabric (MSF1) interface 140.

In one embodiment, targets are grouped with one or more other targets having similar traffic characteristics to form target sub-groups. For example, in the embodiment of FIG. 1, TM unit 108 and GP processor 110 comprise a target sub-group 142, NRAM control channels 112 and 114 comprise a target sub-group 144, NRAM control channels 116 and 118 comprise a target sub-group 146, and NRAM control channel 120 and Peripheral Component Interface Express (PCI-X) interface 122 comprise a target sub-group 148. Additionally, first cryptographic unit 124 and MSF0 interface 126 comprise a target sub-group 150, DRAM control channels 128 and 130 comprise a target sub-group 152, PKE unit 132 and hash unit 134 comprise a target sub-group 154, and DRAM control channels 136 and 137, second cryptographic unit 138, and MSF1 interface 140 comprise a target sub-group 156.

To support target sharing, the chassis interconnect infrastructure of network processor architecture 100 includes appropriate multiplexed circuitry. The multiplexed circuitry employs various multiplexers (commonly referred to as "muxes") to route arbitrated signals on shared buses. At the target sub-group level, this includes sub-group data multiplexers 158A, 158B, 158C, 158D, 158E, 158F, and 158G. Meanwhile, bus circuitry is provided to couple each target sub-group (through its respective multiplexer) to each of processing element clusters 102A, 102B, 102C and 102D. This bus circuitry is depicted as bus sets 172 and bus sets 174. In the illustrated embodiment, there is one set of buses for each target sub-group. Each set of buses is depicted as an individual bus line. For example, bus sets 172 include bus lines 176, 178, 180, and 182, while bus sets 174 include bus lines 184, 186, 188, and 190. It will be understood that each bus line represents a set of signal lines corresponding to a given bus. The width of each bus will generally be dependent on the particular requirements of the network processor implementation.

The bus lines in each of the bus sets 172 and 174 are coupled to processing element clusters 102A, 102B, 102C, and 102D via respective sub-group data selection multiplexers. These include sub-group data selection multiplexers 192A, 192B, 192C, and 192D for bus sets 172, and sub-group data selection multiplexers 194A, 194B, 194C, and 194D for bus sets 174.

In one embodiment, network processor architecture 100 includes five bus types: push data and push ID buses for data reads from shared targets, pull data and pull ID buses for data writes to targets, and command buses for controlling interactions between a target and a master that initiates the corresponding transaction request. The buses illustrated in FIG. 1 correspond to sets of push data buses for network processor architecture. For clarity, the push ID, pull, pull ID, and command buses are not illustrated in FIG. 1. Details of portions of the push ID bus architecture are described below.

During packet processing operations, various transaction requests will be made by various masters to various targets. For the following examples, read transaction requests and subsequent processing of granted requests are considered. The arbitration operations to support arbitration of read transaction requests is referred to herein as "Push" arbitration, and the requests are known as "push-data" (target read) transaction requests. The operations described below to support push-data transactions are generally illustrative of analogous "pull-data" (target write) transactions, except that pull data and pull ID buses having different configurations from that shown herein for push data and push ID buses would be used.

A key challenge that makes data bus arbitration more difficult than the command bus schemes is the support of burst transactions by the targets. In one embodiment, targets support a programmable burst size that results in transfers on a data bus ranging from 1 quad-word (8(B)ytes) to 16 quad-words (128B). In order to maintain efficiency, embodiments of the data bus arbitration scheme support burst size tuning such that overall performance of the data bus remains at an optimal level.

Embodiments described below support user programmable pipelining and burst-size selection schemes. This improves the overall data bus performance via higher utilization and lower average latency depending on the application's intended usage of the target traffic (single transaction or burst transaction). The embodiments also include a scheme for reclaiming the arbitration latency from back-to-back burst transactions and for losing burst transaction requests.

In an aspect of some embodiments, bus contention issues are resolved using a two-stage arbitration scheme, wherein the first stage arbitrates between sub-groups and the second stage arbitrates between processing element clusters. For example, details of embodiments of an exemplary two-stage arbitration scheme are shown in FIGS. 1a, 1b, 2a-c, 3, and 4.

Figure 1B:
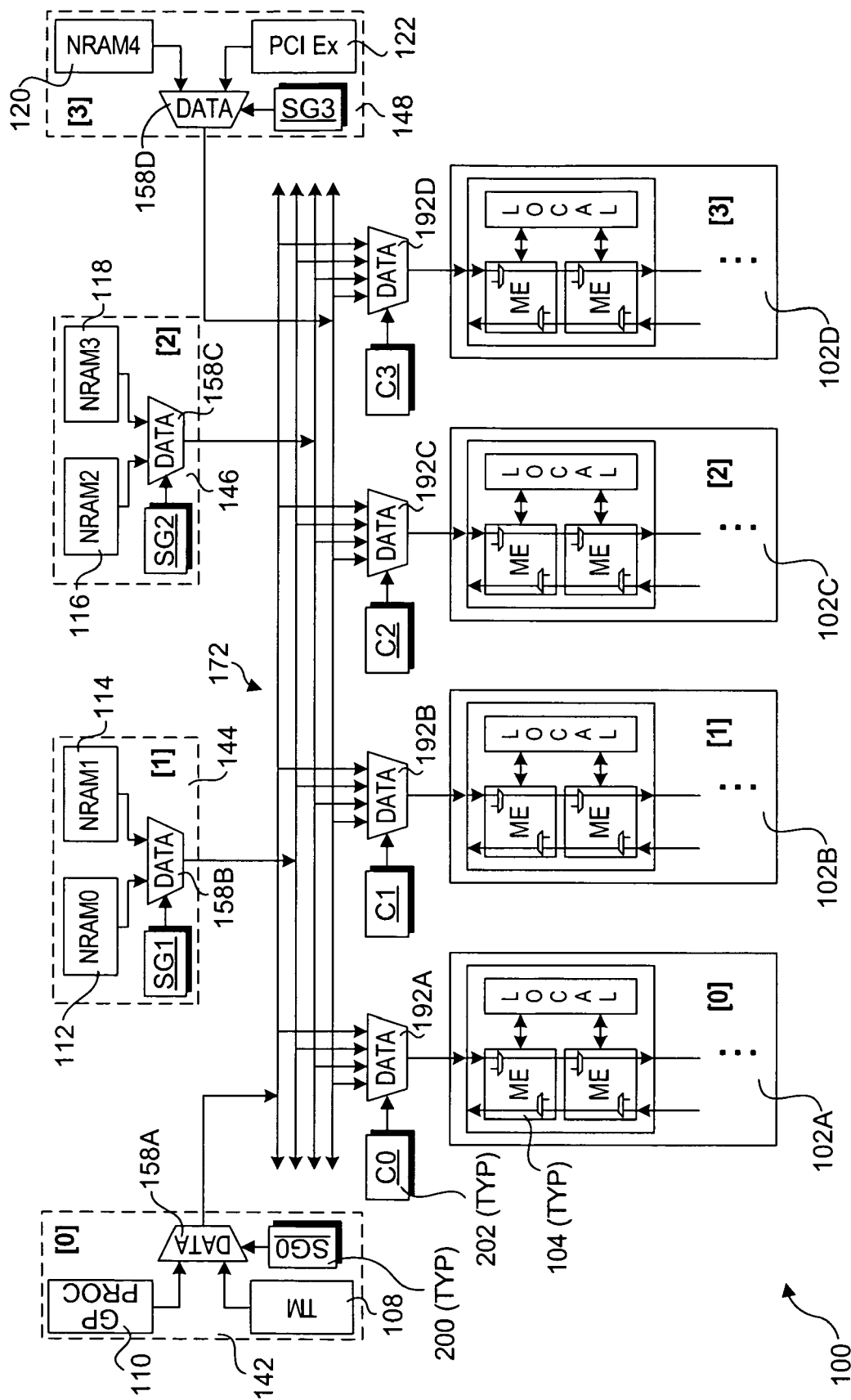
FIG. 1b is a schematic diagram showing further details of the network processor architecture of FIG. 1a, including details of a pipelined data bus with two-stage arbitration.

FIG. 1b shows further details of network processor architecture 100, where the "north" half of the chassis infrastructure is shown. A respective first-stage (sub-group) arbiter 200 (labeled SG0 for sub-group 142 (sub-group [0]), SG1 for sub-group 144 (sub-group [1]), SG2 for sub-group 146 (sub-group [2]), and SG3 for sub-group 148 (sub-group [3])) is used to control the operation of sub-group data multiplexers 158A-D. Similarly, a respective second stage (cluster) arbiter 200 (labeled C0 for cluster 102A (cluster [0]), C1 for cluster 102B (cluster [1]), C2 for cluster 102C (cluster [2]), and C3 for cluster 102D (cluster [3])).

Figure 1C:
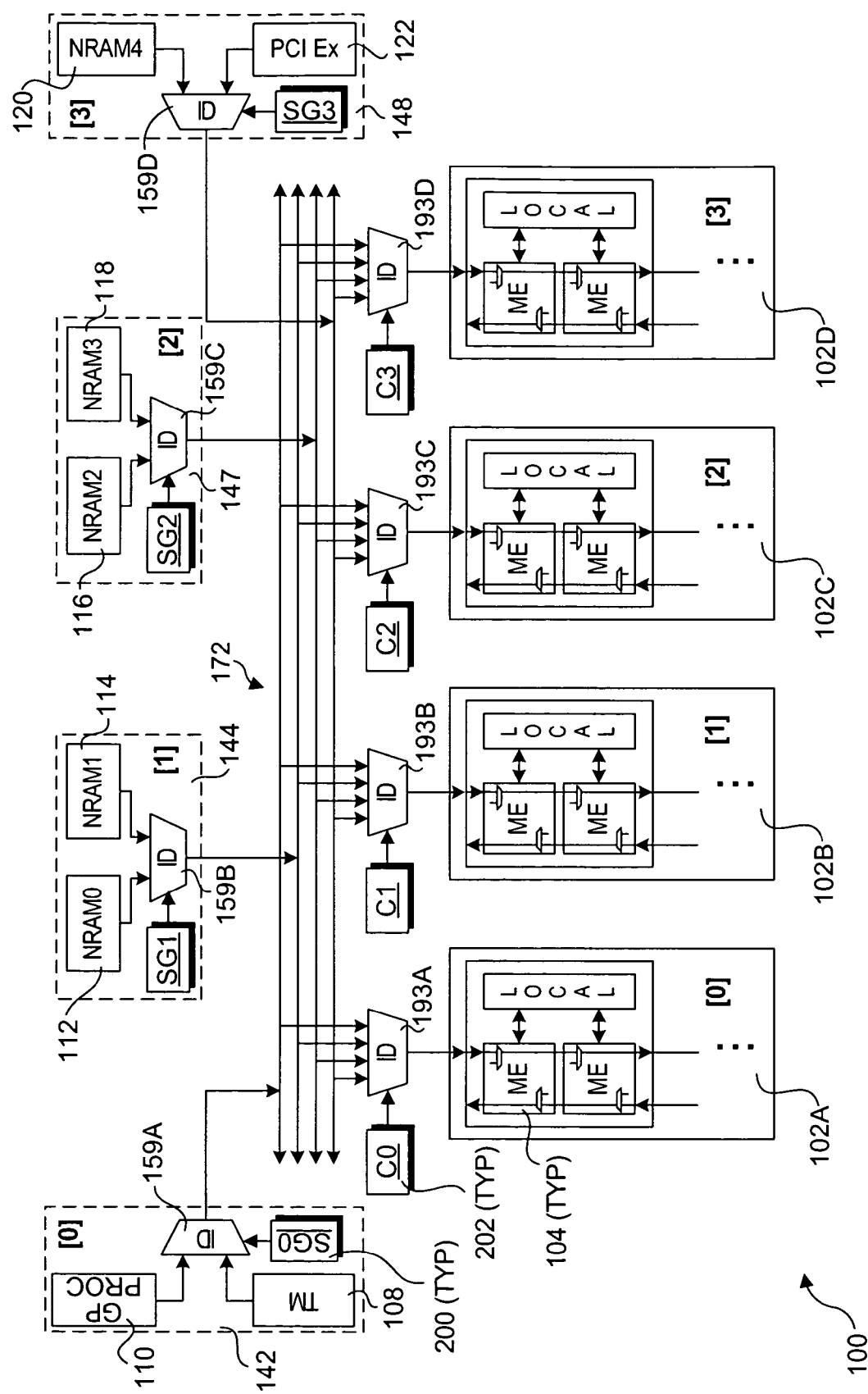
FIG. 1c is a schematic diagram showing further details of the network processor architecture of FIG. 1a, including details of a pipelined requester identification (ID) bus with two-stage arbitration.

FIG. 1c shows details of the push ID bus infrastructure of one embodiment of network processor architecture 100. The general layout of the push ID bus is similar to the push data bus of FIG. 1b, wherein sub-group data multiplexers 158A-D are replaced with sub-group ID multiplexers 159A-D, and sub-group data selection multiplexers 192A-D are replaced with sub-group ID selection multiplexers 193A-D.

Figure 2A:
FIG. 2a is a schematic diagram illustrating high-level details of a two-stage arbitrator used to arbitrate data transactions under the architecture of FIG. 1, according to one embodiment of the invention.

One embodiment of a two-stage arbitration scheme including a stage 1 sub-group arbiter 200 and a stage 2 cluster arbiter 202 is shown in FIG. 2a. The arbitration operations performed by both the sub-group and cluster arbiters are generally continuous (ongoing). For the purpose of clarity, the following arbitration operations will be discussed in view of a single or low number of concurrent arbitration conditions. It will be understood that these arbitration operations can be scaled to be concurrently implemented using a relatively large number of targets and masters.

Figure 2B:
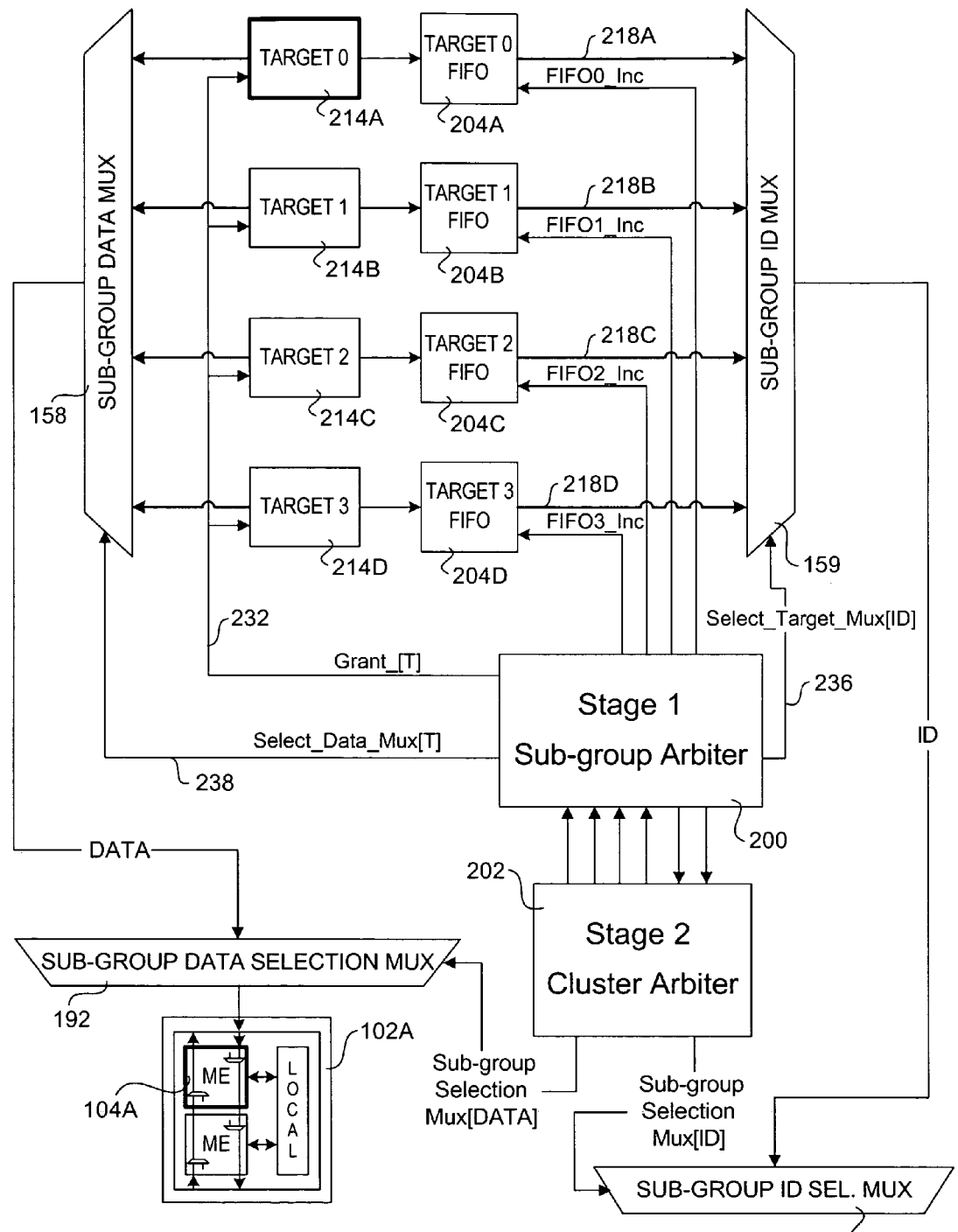
FIG. 2b is a schematic diagram illustrating details of the control signals issued by the sub-group arbiter and cluster arbiter of FIG. 2, according to one embodiment of the invention.

The component configuration of FIGS. 2a and 2b corresponds to an implementation having four targets within a given sub-group. Such a situation is illustrated by way of example by target sub-group 156 in FIG. 1. The architecture may be easily scaled to support sub-groups having more or less than four targets; the use of four targets here is merely exemplary.

In general, a first-in, first-out (FIFO) buffer will be provided to store transaction requests for each target within a sub-group. In the embodiment of FIGS. 2a and 2b, these include FIFO buffers 204A, 204B, 204C and 204D. As target transaction requests are issued by various masters (e.g., microengines 104) to selected targets, the requests are transferred to corresponding FIFO buffers 204A-D by the target. The target is aware whether the target FIFO is full by counting the number of issued requests and received grants. As described below in further detail, a previously-stored target transaction request is flushed from a given FIFO only when the transaction request is granted and completed, such that transaction requests from a given target are granted in the order they are issued by the target. In addition, every time a request is sent from the stage 1 arbiter to the stage 2 arbiter, the winning target's request FIFO is masked. This FIFO in unmasked once a win/lose confirmation is received from the stage 2 arbiter. In one embodiment, each FIFO buffer 204A-D stores two transaction requests. Other FIFO buffer embodiments may store additional transaction requests.

Various signals are illustrated in FIGS. 2a and 2b to depict store and read operations for each of FIFO buffers 204A-D. This include a respective target transaction request signals 206A-D received at each FIFO buffer 204A-D; these signals are labeled Target#_Req[ID], wherein the # value identifies the Target FIFO for the subgroup (0-3 when the number of targets in a sub-group equals 4, for example), and wherein [ID] represents information pertaining to the transaction request. In one embodiment the ID value identifies the microengine issuing the request, the cluster the microengine resides in, and the length of the request.

During the arbitration cycle for sub-group arbiter 200, FIFO entries of non-empty FIFO buffers are read by sub-group arbiter 200. These signals are depicted as target transaction request signals 208A, 208B, 208C, and 208D, and are labeled Req#[C,L], wherein the # value identifies the Target FIFO issuing the request and the [C,L] represents the cluster for the master from which the transaction request originated and the length of the transaction. (For the purpose of the two-stage arbitration process, the particular microengine initiating the request does not need to be known) by the arbiters.) In one embodiment, each FIFO buffer 204A-D provides a respective "empty" signal 210A-D to the sub-group arbiter 200 to inform the arbiter whether that FIFO buffer is empty. These signals are labeled Empty#, wherein the # value identifies the Target FIFO buffer asserting an empty signal.

In one embodiment, non-empty FIFO buffers 204A-D place [C,L] data corresponding to their least-recent [ID] entry on their output data lines to be read by sub-group arbiter 200 Details of one embodiment of the output data lines are shown in FIG. 2B. In this embodiment, target FIFO buffers 204A-D are coupled to respective targets 214A-D. Each of target FIFO buffers 204A-D is coupled to a sub-group ID multiplexer 159 via a respective set of bus lines 218A-D.

Returning to FIG. 2A, various selected control signals are shown that are passed between sub-group arbiter 200 and cluster arbiter 202. The signals passed from sub-group arbiter 200 to cluster arbiter 202 include a sub-group winner (Sub-Group_[G]_Winner[C]) signal 220 and a sub-group winner length (Sub-Group_[G]_Winner_Length[4:0]) signal 222. As depicted by the nomenclature Sub-Group_[G]_Winner [C], group winner signal 220 identifies the sub-group [G] of the target that issued the winning transaction request (of this first sub-group arbitration stage) and the cluster [C] corresponding to the master (e.g., a microengine 104) originating the transaction request. The length of the winning request (e.g., information indicating the size requested for a corresponding data transaction) is provided via sub-group winner length signal 222. In the illustrated embodiment, the value [4:0] indicates that a 5-bit signal is used to specify the length of the read transaction; however, other bit-lengths may also be used. In one embodiment, each resulting decimal value specified by the bit values in the value [4:0] is multiplied by 8 Bytes to obtain the length of the requested transaction. For example, a value of x00100 would be used to indicate the requested transaction has a length of 32B. In another embodiment, the decimal value for the value [4:0] specifies a number of words, double-word, or quad-words in the transaction.

The signals passed from cluster arbiter 202 to sub-group arbiter 200 include a cluster grant signal 224 (Cluster_[C] _Grant[G]), a cluster last grant signal 226 (Cluster_[C]_Last-_Grant[G]), a cluster loser signal 228 (Cluster_[C]_Loser [G]), and a cluster hold burst signal 230 (Cluster_[C] _Hold_Burst[G]). For each of these signals, the [C] value identifies the cluster, while the [G] value identifies the sub-group. In practice, there will be sets of signals 220, 222, 224, 226, 228 and 230 passed between sets of sub-group and cluster arbiters; for convenience and clarity, only one signal is shown in FIG. 2a. Further details of each of these signals are discussed below.

In response to its input signals, cluster arbiter 202 produces a stage 2 arbitration output comprising a sub-group data selection multiplexer signal 231, and a sub-group ID selection multiplexer signal 232, which are used to select routing of appropriate sub-group selection and ID multiplexers over which data from the target may be transferred at an appropriate time to perform a granted transaction.

In addition to the foregoing signals, sub-group arbiter 200 also provides control signals for selecting targets and activating push data and ID multiplexers. These signals include a grant target (Grant_[T]) signal 232, a select target multiplexer (Select_Target_Mux_[ID]) signal 236, and a select data multiplexer (Select_Data_Mux) signal 238. The grant target signal 232 is provided as inputs to each of targets 214A-D. The select target multiplexer signal 236, and select data multiplexer signal 238 are used as respective control input signals sub-group ID multiplexer 159 and to a sub-group pull data multiplexer 158.

In response to a transaction request being granted, a corresponding transaction is performed. During the transaction data stored by the target is "pulled" from the target and passed to the master that originated the transaction request. In the example illustrated in FIG. 2b, the master comprises a microengine 104A in cluster 102A and the target comprises target 214A. To effectuate the transfer of data from target 214A to microengine 104A, each of sub-group pull data multiplexer 240 and sub-group selection multiplexer 192A are momentarily configured (in response to appropriate control signal inputs) to create a data path between target 214A and cluster 102A. At the same time, additional multiplexing is performed within cluster 102A to forward the data received by the cluster to microengine 104A (not shown in FIG. 2b).

Further details of one embodiment of sub-group arbiter 200 are shown in FIG. 3. The sub-group arbiter includes three main functional blocks, comprising decode logic and round-robin arbiter 300, stage 1 mask logic 302, and a pending queue 302. In one embodiment, the decode logic and round-robin arbiter are comprise separate function blocks (not shown). As its name implies, decode logic and round-robin arbiter 300 is used for decoding various input signals and for performing round-robin arbitration. In one embodiment, the functions performed by decode logic and round-robin arbiter 300 are implemented via programmed logic.

In one embodiment, the round robin arbitration includes a skid function, wherein the arbiter "skids" to the next requesting input corresponding to the round robin scheme. For example, suppose the round robin scheme arbitrates between transaction requests issued by four requesters 0-3. In a common sequential round robin scheme, the round robin winner would be (in sequence) 0, 1, 2, 3, 0, 1, 2, 3 . . . etc. But what happens if a next winner in the sequence does have a pending request? For example, suppose the round robin sequence is about to select requester 2, which does not have a pending request. The skid function skips the requester element without a pending requests and "skids" to the next element with a pending requests. In this example, suppose that requester 3 has a pending request. The foregoing sequence would thus be 0, 1, 3, 0 . . .

In one embodiment, the decode logic and round-robin arbiter 300 receives four sets of input signals. These input signals include a set of target transaction request signals 209A-D (similar to target transaction request signals 208A-D minus the transaction request length value), and the set of empty signals 210A-D shown in FIG. 2a. The input signals further include a set of target request length signals 306 (e.g., Req0_Length[4:0]). The target request length signals are used to convey the length of the transaction requested by the target, and are analogous in configuration to sub-group winner length signal 222 discussed above. In one embodiment, target request length signals 306 are issued along with target transaction request signals 209A-D. (It is noted that target request length signals 306 are not shown in FIG. 2a for clarity and convenience.) The input signals to decode logic and round-robin arbiter 300 further include mask signals 308 that are output from stage 1 mask logic 302. The mask signals are used to effect target and cluster winner signal operations when pipelining is turned on or off, as described in further details below.

The decode logic and round-robin arbiter 300 outputs three sets of signals. These include target winner signals 310 (Winner_Target[T], sub-group winner signals 220 and sub-group winner length signals 222. Target winner signal 310 is fed back to stage 1 mask logic 302, and pending queue 304, which is used to store the speculative stage-1 arbitration cluster winner's target information and cluster information.

Figure 2C:
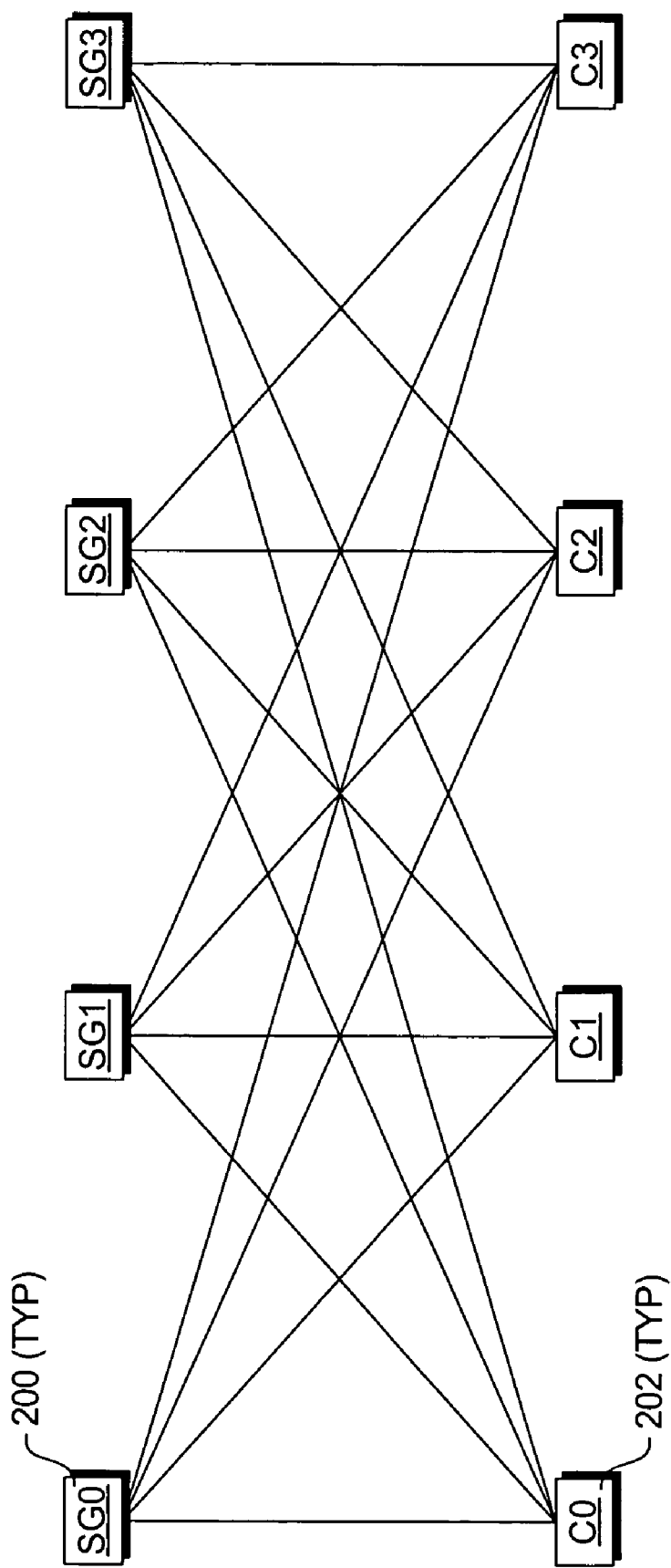
FIG. 2c is a schematic diagram illustrating the logical cross-linked relationships between a set of first stage sub-group arbiters and a set of second cluster arbiters in accordance with a two-stage arbitration scheme, according to one embodiment of the invention.

As shown in FIG. 2c, each of the various sub-group arbiters 200 are logically cross-linked to each of the cluster arbiters 202. In one embodiment, the infrastructure for facilitating the cross-linking comprises is similar to the cross-bar interconnect scheme shown in FIG. 1a-c. Thus, each sub-group arbiter 200 will provide outputs (sub-group winner signals 220 and sub-group winner length signals 222) to each cluster arbiter 202. In accordance with the nomenclature of the example illustrated herein, the cluster arbiters are cluster arbiters C0, C1, C2, and C3. Thus, each sub-group winner signal and sub-group winner length signal will identify the sub-group arbiter from which it is issued so that each cluster arbiter that receives these signals will know where they came from.

Pending queue 304 also receives other input signals, including cluster grant signals 224, last cluster grant signals 226, cluster loser signals 228 and cluster hold burst signal 230. Each set of cluster grant signals 224, last cluster grant signals 226, cluster loser signals 228, and cluster hold burst signals 230 are provided as outputs from a respective cluster arbiter 202.

As discussed above, sub-group arbiter provides four output signals that are used as control inputs to the sub-group targets 214A-D, sub-group data multiplexer 158, and sub-group data multiplexer 159 (FIG. 2b). These include target grant signals 232, FIFO increment (Inc) signals 212A-D, select target multiplexer signal 236, and a select data multiplexer signal 238.

Further details of one embodiment of the stage-2 cluster arbiter 202 are shown in FIG. 4. The primary functional blocks include a round-robin arbiter 400 and a burst counter 402. In one embodiment, round-robin arbiter 400 includes a skid function analogous to the skid function described above. In one embodiment, the functionality of burst counter 402 is implemented via a finite state machine (FSM). In general, the functionality of the cluster arbiter 202 may be implemented via programmed logic implemented in a network processor die.

The Round-robin arbiter 400 for each cluster arbiter 202 receives two inputs corresponding to transaction requests from each of the sub-group arbiters 200, sub-group winner signals 220, and cluster hold burst signals 230. In response to these inputs, round-robin arbiter 400 produces a cluster loser signal 228, sub-group selection multiplexer signal 231, and a cluster winner (for sub-group[G]) (Cluster_Winner[G]) signal 404, a sub-group data selection multiplexer signal 231, and a sub-group ID selection multiplexer signal 233.

Burst counter 402 is used to count data bursts and output burst hold signals based on the length of recently-granted data transactions. It receives two types of inputs, including a cluster winner signal 404 and a set of sub-group winner length signals 222, the latter of which defines the length of stage-1 winning transaction requests received from the various sub-group arbiters. In response to these inputs, burst counter 402 produces cluster hold burst signals 230, cluster grant signals 224, and last cluster grant signals 226. Respective sets of signals 230, 224 and 226 are returned to each of the sub-group arbiters.

In response to a cluster winner length value of greater than 1 (which identifies the pull data transaction is a burst transaction), burst counter 402 begins to count transaction cycles corresponding to a current burst transaction. Generally, one data path width of data (e.g., a word, double-word, or quad-word) is transferred to the next pipeline stage during each cycle. In one embodiment, the number of cycles required for transferring an entire burst is specified by the cluster winner length signal 314 value. While the burst transaction is ongoing, cluster hold burst signal 230 is set to indicate re-arbitration of the sub-group arbiter for the transaction's target is not to be performed (i.e., to remain on hold). It also is used to invalidate subsequent pipelined cluster arbiter winners until the transaction is complete. At the completion of the transaction, a cluster last grant signal is provided from the cluster arbiter and cluster hold burst signal 230 is cleared, indicating to the sub-group arbiter (for the transaction's target) that it can now resume providing new stage-1 arbitration winners to the cluster arbiter.

Figure 5:
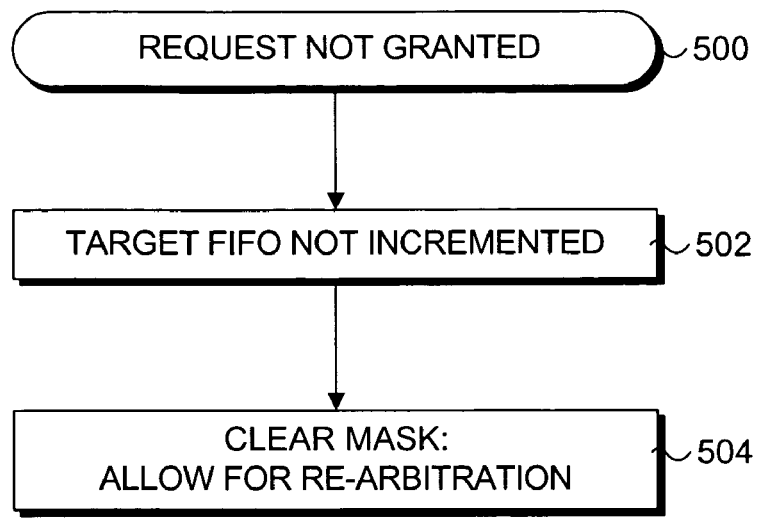
FIG. 5 is a flowchart illustrating operations performed by the pending queue control logic when a target's transaction request is not granted by the stage 2 (cluster) arbiter.

FIG. 5 shows a flowchart illustrating operations that are performed for target transaction requests that are not granted by the two-stage arbiter. The process begins in a start block 500 in which a request is not granted. As a result, the corresponding target FIFO buffer is not incremented, as depicted in a block 502. The mask for the stage 1 (sub-group) arbiter is then cleared, allowing for re-arbitration of the stage 1 arbiter in a block 504.

Figure 6:
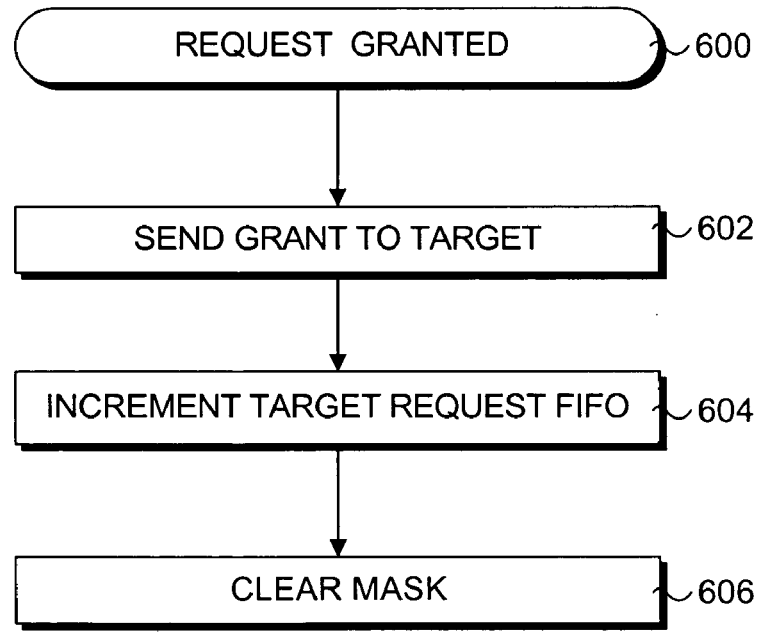
FIG. 6 is a flowchart illustrating operations performed by the pending queue control logic when a target's transaction request is granted by the stage 2 (cluster) arbiter.

FIG. 6 shows a flowchart illustrating operations that are performed for target requests that are granted by the cluster arbiter. The process beings in a start block 600 with a granted target request. In response, a grant is sent to the target in a block 602. For example, in the embodiment of FIGS. 2a and 2b, target grant signal 232 is selected for the target requesting the pull data transaction. In response, the target request FIFO buffer corresponding to the requesting target is incremented in a block 604. The mask for the target's sub-group is then cleared in a block 606.

Due to the high speed of the chassis arbitration clock, the latency to complete one arbitration event through the 2-stage arbiter is generally 2-3 cycles. Enabling pipelining of the sub-group requests ensures that no bubbles are inserted between consecutive requests from a target sub-group, resulting in high utilization. However, the multi-cycle arbitration latency resulting from a pipelined arbitration scheme adds complexity to the pipelining of arbitration requests from the targets in the sub-group.

In accordance with one embodiment, when a burst transaction request wins arbitration, subsequent pipelined transaction requests from the same sub-group that win arbitration in other clusters are invalidated until the original burst is completed. Under a conventional approach, this would lead to unnecessary clogging of other clusters with invalid arbitration requests and hence wasted bandwidth. This is addressed by one embodiment by making a first phase (phase-1) of pipelining at the stage 1 (sub-group) arbiter a user configurable option. On the chassis, targets are grouped such that they have similar burst properties. For targets sub-groups that primarily support long bursts, the user can turn off the pipelining to avoid lost bandwidth due to invalidations. In contrast, for target sub-groups that use non-burst or short burst transactions, enabling pipelining ensures that the data bus is efficiently utilized. The programmability of the pipelining option can also be used to tune for a specific application's access patterns. Furthermore, the programming can be performed "on the fly" during ongoing network processor operations.

Figure 7:
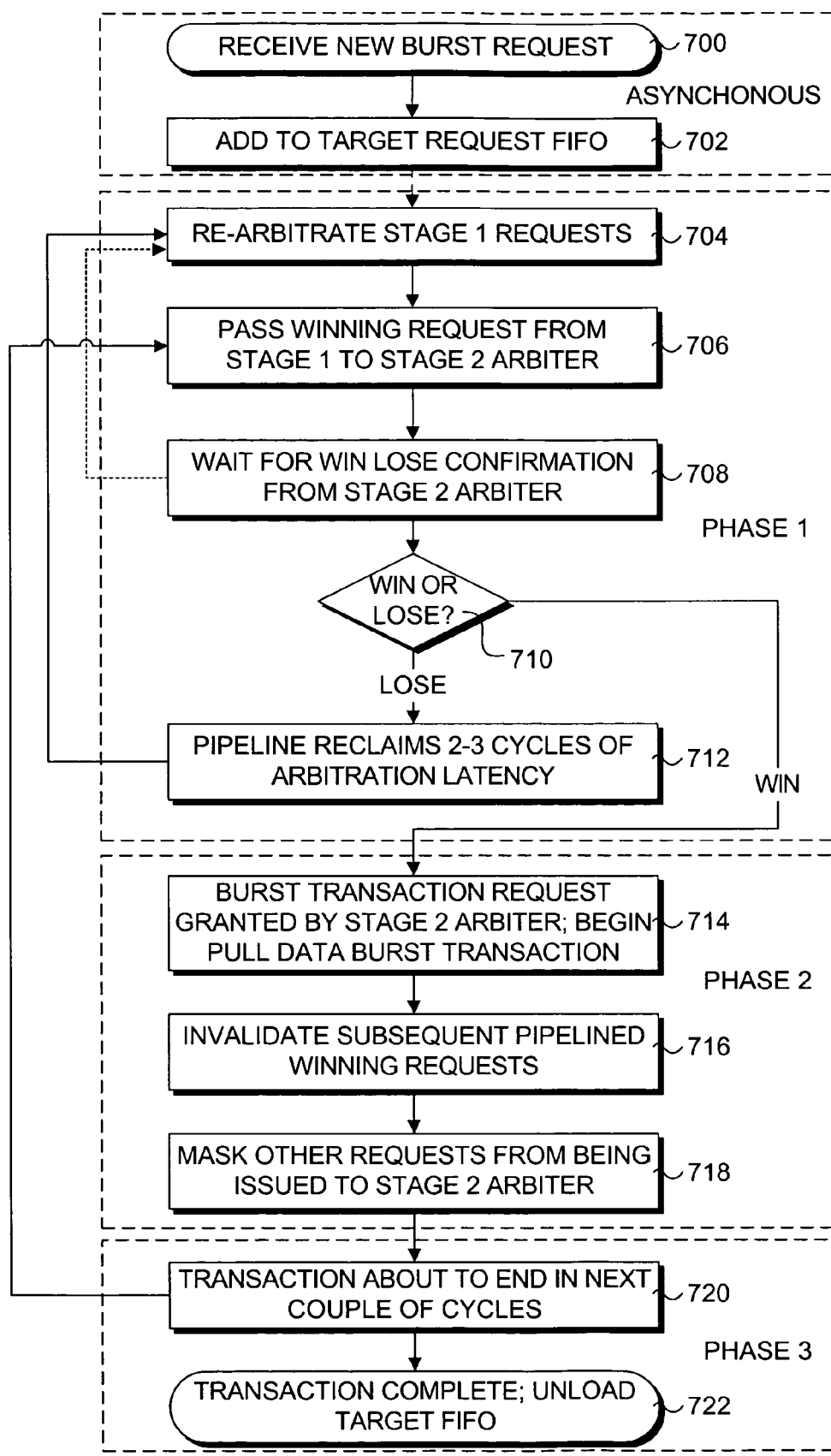
FIG. 7 is a flowchart illustrating operation and logic performed during a three-phase burst transaction arbitration and transfer process, according to one embodiment of the invention.

Operations and logic performed during processing of burst transaction request, according to one embodiment, are shown in FIG. 7. During ongoing operations, various burst transaction requests (i.e., data transactions requests having a length of greater than one) are issued by various masters and received by corresponding targets, as depicted by a start block 700. In response to receiving a burst transaction request, the request is added to the target's FIFO buffer in a block 702 (if there is room in the FIFO buffer). The operations of blocks 700 and 702 are generally asynchronous to the rest of the operations shown in FIG. 7.

The remaining operations correspond to arbitrating the transaction requests and operations relating to arbitration of the chassis data buses during transaction request processing and data transfers corresponding to granted transactions. In one embodiment, a two-stage arbitration process that encompasses three phases is performed. Phase 1 of the process begins with re-arbitration of existing stage 1 requests in a block 704. This operation is performed by a sub-group arbiter 200 using the operations of the functional blocks described above with reference to FIGS. 2a, 2b, and 3. The result of the re-arbitration produces a sub-group transaction request winner, which is passed from the stage 1 (sub-group) arbiter to an appropriate stage 2 (cluster) arbiter (based on the cluster of the master originating the request) in a block 706. In a block 708, the process waits for a win/lose confirmation for the winning sub-group transaction request from the stage 2 arbiter. In one embodiment, pipelining with zero bubbles for non-burst transactions are concurrently supported by re-arbitrating addition stage 1 transactions requests during the wait time.

In accordance with the win/loss result of a decision block 710, if the stage 2 arbiter returns a lose result, the logic proceeds to a block 712, which depicts the pipeline reclaiming 2-3 cycles of arbitration latency. The process then returns to block 704 to before the next re-arbitration of the stage 1 request. This completes the operations of phase 1.

If the winning sub-group transaction request is also a winner of the stage-2 arbitration, the logic proceeds to a block 714, which commences phase 2 operations. In block 714, the pull data burst transaction is initiated via appropriate control signals provided to the target, the target's sub-group multiplexer, and the appropriate target sub-group selection multiplexer for the cluster in which the requesting master (e.g., microengine 104) resides. Concurrently, the cluster arbiter is programmed to invalidate subsequent pipelined winning requests from being granted in a block 716, while masking other requests from being issued to the stage 2 arbiter in a block 718. The reason for these operations is that the bus routing during a given burst transaction cannot be reconfigured until the transaction is completed. Thus, by invalidating subsequent pipelined winning transaction requests and masking new stage-1 winning transactions request from being issued to the stage 2 arbiter during a burst transaction, the stage 2 arbiter cannot attempt to reconfigure the portion of the data routing it controls.

The transaction process continues until the transaction is about to end. At this point, as depicted by a block 720, phase 3 begins. Since the transaction is about to end in the next couple of cycles, operations that are performed during earlier pipelined stages are allowed to resume. This returns the logic to block 706, wherein a next stage 1 winning transaction request is passed to the stage 2 arbiter for second stage arbitration. At the same time, the invalidation and masking operations in blocks 716 and 718 are caused to cease at the completion of phase 2. Concurrently, the transaction proceeds to completion during phase 3, as depicted by a process end block 722. Once the stage 2 winner confirmation is received and the burst transaction is completed, the target FIFO is unloaded.

Figure 8:
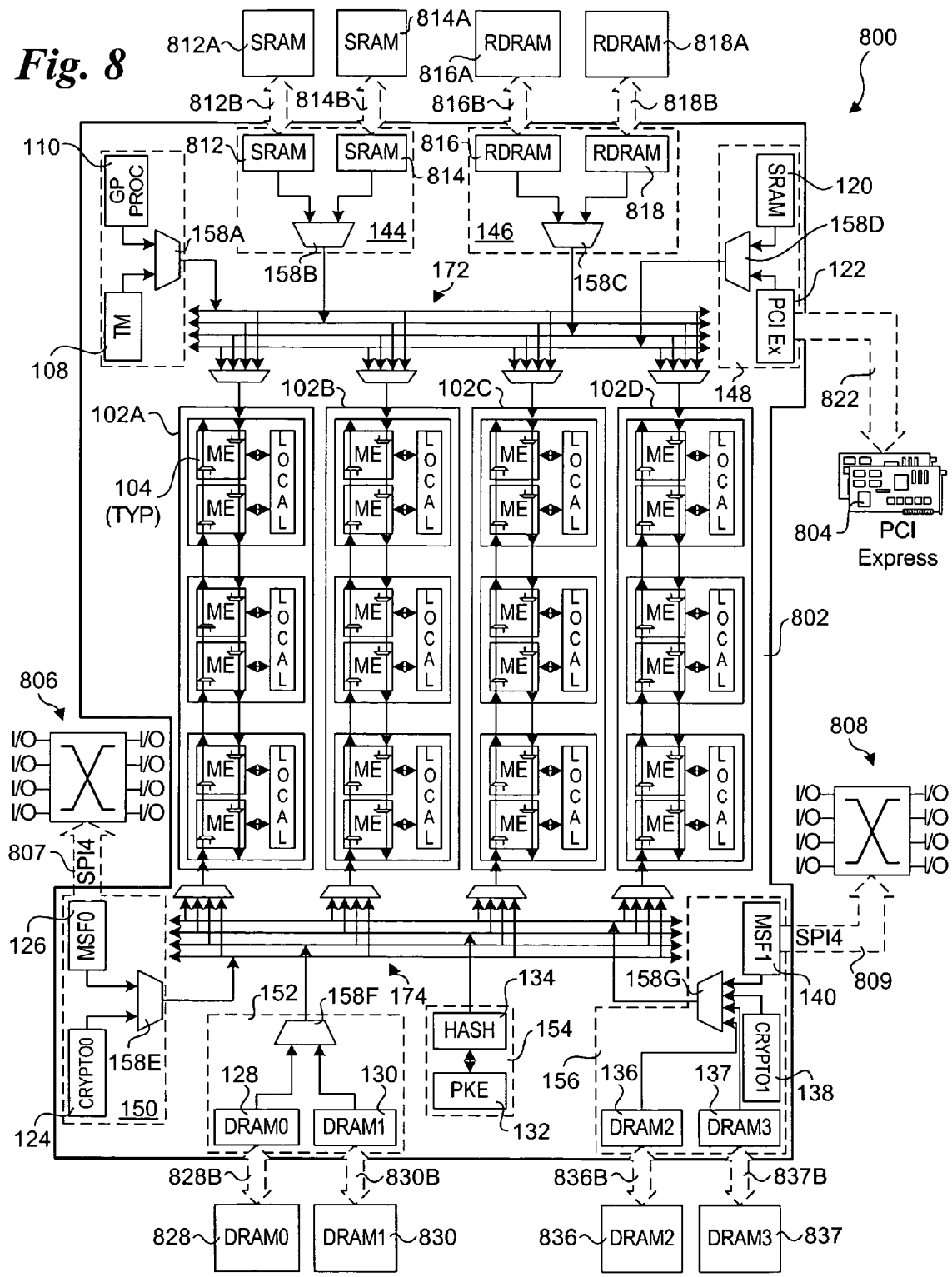
FIG. 8 is a schematic diagram of a network device including a network processor implementing the architecture of FIG. 1, according to one embodiment of the invention.

Network processors that implement architecture 100 of FIG. 1, and include support for the two-stage arbitration operations discussed above may be implemented in various network devices, such as, but not limited to, switches, line cards, routers, etc. FIG. 8 shows an exemplary architecture of a network device 800 including a network processor 802 that implements network processor architecture 100. In general, like-numbered components in FIGS. 1 and 8 perform similar functions. In addition, network processor 802 includes SRAM control channels 812 and 814, RDRAM control channels 816 and 818, as well as an on-chip SRAM control and store 120 (depicted as a single unit).

As discussed above, the crossbar chassis configuration of network processor architecture 100 enables various masters (e.g., microengines 104) to access various targets via corresponding transactions requests. In some embodiments, some of the actual data or operations supported by the "effective" targets are provided on the network processor chip, while others are provided off-chip. For example, while an NRAM control channel may comprise a target (for the purpose of the foregoing discussion), the effective target is the actual NRAM store that is accessed via the NRAM control channel (since the control channel does not store any data by itself).

In the exemplary configuration shown in FIG. 8, the on-chip "effective" targets include traffic manager 108, general-purpose processor 110, an SRAM store 120A, cryptographic units 124 and 138, hash unit 134, and public key encryption unit 132. Meanwhile, various off-chip effective targets include external SRAM stores 812A and 814a, external RDRAM stores 816A and 818A, one or more Peripheral Component Interface Express (PCI-X) devices (e.g., expansion cards) 804, and external DRAM stores 828, 830, 836, and 837. Each off-chip memory store is connected to its respective control channel by a respective interface. These include SRAM interfaces 812B and 814B, RDRAM interfaces 816B and 818B, DRAM interfaces 828B, 830B, 836B, and 837B, and Peripheral Component Interface Express (PCI-X) interface 822.

Network devices are used to perform packet-processing operations. One of the primary functions performed during packet processing is determining the next hop to which the packet is to be forwarded. A typical network device, such as a switch, includes multiple input and output ports. More accurately, the switch includes multiple input/output (I/O) ports, each of which may function as either an input or an output port within the context of forwarding a given packet. An incoming packet is received at a given I/O port (that functions as in input port), the packet is processed, and the packet is forwarded to its next hop via an appropriate I/O port (that functions as an output port). The switch includes a plurality of cross-connects known as the media switch fabric. The switch fabric connects each I/O port to the other I/O ports. Thus, a switch is enabled to route a packet received at a given I/O port to any of the next hops coupled to the other I/O ports for the switch.

The exemplary network device of FIG. 8 includes two sets of media switch fabrics 806 and 808. In one embodiment, media switch fabric 806 is connected to first media switch fabric interface 126 via a System Packet Interface Level 4

(SPI4) interface 807, while media switch fabric 808 is connected to second media switch fabric interface 140 via an SPI4 interface 809.

In general, aspects of the foregoing embodiments may be implemented using programmed logic using semiconductor fabrication techniques. In addition, embodiments of the present description may be implemented within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
    a plurality of bus masters, configured in a plurality of clusters;
    a plurality of target sub-groups, each target sub-group including at least one target, each target comprising a sharable resource that is accessible to the plurality of bus masters;
    a chassis interconnect, comprising a plurality of sets of bus lines connected between the plurality of clusters and the plurality of sub-groups forming crossbar interconnects including a plurality of sub-group multiplexers and a plurality of sub-group selection multiplexers; and
    a two-stage arbiter, operatively coupled to the targets, sub-group multiplexers, and sub-group selection multiplexers, to manage and service transaction requests issued from the plurality of bus masters to the plurality of targets via the chassis interconnect.

2. The apparatus of claim 1, further comprising a plurality of target request buffers, each target request buffer coupled between a respective target and a first stage of the two-stage arbiter.

3. The apparatus of claim 2, wherein the plurality of target request buffers include a plurality of first-in first out (FIFO) buffers.

4. The apparatus of claim 1, wherein the two-stage arbiter includes:
    a first stage comprising a sub-group arbiter that arbitrates pull data transaction requests issued by the at least one target in a corresponding sub-group; and
    a second stage comprising a cluster arbiter that arbitrates winning pull data transaction requests passed to the cluster arbiter from one or more sub-group arbiters.

5. The apparatus of claim 4, wherein the two-stage arbiter comprises a plurality of sub-group arbiters cross-linked to a plurality of cluster arbiters.

6. The apparatus of claim 1, wherein the apparatus comprises a network processor, and the plurality of bus masters includes a plurality of packet-processing elements.

7. The apparatus of claim 1, wherein each of a first and second stage in the two-stage arbiter includes a round-robin arbiter.

8. The apparatus of claim 7, wherein at least one of the round-robin arbiters includes a skid function.

9. The apparatus of claim 1, wherein the two-stage arbiter includes a programmable pipelining feature to enable a user to selectively activate or deactivate pipelining of transaction request arbitration processing for a selected target sub-group to tune the arbitration processing in view of actual or expected access patterns.

10. The apparatus of claim 9, wherein a second stage of the two-stage arbiter includes a burst counter to count burst cycles and assert a burst hold signal during a burst transaction.

11. The apparatus of claim 1, wherein one of the targets comprises a cryptography unit.

12. The apparatus of claim 1, wherein one of the targets comprises a media switch fabric interface.

13. The apparatus of claim 1, wherein one of the targets comprises a traffic manager.

14. A method comprising:
    performing a first stage arbitration of a plurality of transaction requests issued by a plurality of targets in a sub-group of targets, each target comprising a shared resource that is operatively coupled to a plurality of processing elements arranged in a plurality of clusters via an interconnect, the first stage arbitration producing a sub-group winner;
    concurrently performing the foregoing first stage arbitration operation for transaction requests issued by targets in a plurality of respective sub-groups to produce a plurality of sub-group transaction request winners;
    performing a second stage arbitration of the plurality of sub-group transaction request winners to produce a cluster transaction request winner;
    generating a target transaction grant based on the sub-group and cluster transaction request winners, the target transaction grant identifying a winning target and a corresponding transaction request issued for arbitration by that winning target that is granted; and
    arbitrating the interconnect to transfer data from the target receiving the target grant to a processing element that initiated the transaction request that is granted to perform the transaction.

15. The method of claim 14, further comprising:
    enabling individual sub-groups to be selectively programmed to be tuned for processing one of short-burst transactions or long-burst transactions.

16. The method of claim 15, wherein the interconnect includes a pipelined data bus, and wherein individual sub-groups are enabled to be selectively programmed to be tuned for processing short-burst transactions or long-burst transactions by activating or deactivating pipelined processing of transaction requests for those sub-groups.

17. The method of claim 15, wherein individual sub-group may be selectively programmed to be tuned for processing one of short-burst transactions or long-burst transactions on the fly.

18. The method of claim 14, further comprising:
reclaiming one or more cycles of arbitration latency if a losing transaction request in the second stage arbitration corresponds to a burst transaction.

19. The method of claim 14, further comprising:
determining if a winning transaction request of a second stage arbitration corresponds to a burst transaction request; and, if so,
granting a burst transaction corresponding to the burst transaction request; and
invalidating subsequent second stage arbitration winning transaction requests while a burst transaction corresponding the winning burst transaction request is being performed.

20. The method of claim 14, further comprising:
determining if a winning transaction request of a second stage arbitration corresponds to a burst transaction request; and, if it does,
masking requests from being issued for second stage arbitration from a sub-group to which the target issuing the transaction request for arbitration belongs while a burst transaction corresponding the winning burst transaction request is being performed.

21. The method of claim 14, further comprising:
determining if a burst transaction is about to be completed; and in response thereto,
re-enabling winning first stage arbitration transaction requests to be issued for second stage arbitration from the sub-group to which the target issuing the transaction request for arbitration belongs while the burst transaction is being completed.

22. The method of claim 14, further comprising:
storing transaction requests from the plurality of targets in first-in first-out (FIFO) buffers; and
incrementing a FIFO buffer when a transaction request issued by a target corresponding to the FIFO buffer is granted.

23. A network device, comprising:
a network processor including,
a plurality of microengines, configured in a plurality of clusters;
a plurality of target sub-groups, each target sub-group including at least one target, each target comprising a shared resource that is accessible to the plurality of microengines, the targets including a media switch fabric interface and a computer expansion interface;
a chassis interconnect, comprising a plurality of sets of bus lines connected between the plurality of clusters and the plurality of sub-groups to form a crossbar interconnect including a plurality of sub-group multiplexers and a plurality of sub-group selection multiplexers; and
a two-stage arbiter, operatively coupled to the targets, sub-group multiplexers, and sub-group selection multiplexers, to arbitrate granting of data transaction requests issued from the plurality of microengines to the plurality of targets via the chassis interconnect;
a media switch fabric coupled to the media switch fabric interface, the media switch fabric including cross-over connections coupled between a plurality of input/output (I/O) ports, wherein the cross-over connections are coupled to communicate packets between the I/O ports; and
a card, coupled to the computer expansion interface.

24. The network apparatus of claim 23, further comprising:
a dynamic random access memory (DRAM) control channel, comprising a target; and
a DRAM store, coupled to the DRAM control channel.

25. The network apparatus of claim 23, further comprising:
a second media switch fabric interface, comprising a target; and
a second media switch fabric, coupled to the second media switch fabric interface.

26. The network apparatus of claim 23, wherein the two-stage arbiter comprises:
a first stage comprising a sub-group arbiter that arbitrates transaction requests issued by the at least one target in a corresponding sub-group; and
a second stage comprising a cluster arbiter that arbitrates winning transaction requests issued to the cluster arbiter from one or more sub-group arbiters.

* * * * *